(12) United States Patent
Chiou (10) Patent No.: US 8,855,994 B2
(45) Date of Patent: *Oct. 7, 2014

(54) METHOD TO SIMULATE A DIGITAL SYSTEM

(71) Applicant: Derek Chiou, Rollingwood, TX (US)

(72) Inventor: Derek Chiou, Rollingwood, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 13/922,728

(22) Filed: Jun. 20, 2013

(65) Prior Publication Data

US 2013/0282356 A1 Oct. 24, 2013

Related U.S. Application Data

(63) Continuation of application No. 12/950,471, filed on Nov. 19, 2010, now Pat. No. 8,494,831, which is a continuation of application No. 11/633,657, filed on Dec. 4, 2006, now Pat. No. 7,840,397.

(60) Provisional application No. 60/741,587, filed on Dec. 2, 2005.

(51) Int. Cl.
- *G06F 9/44* (2006.01)
- *G06F 17/50* (2006.01)
- *G06F 9/30* (2006.01)
- *G06F 9/38* (2006.01)

(52) U.S. Cl.
CPC ........ *G06F 17/5022* (2013.01); *G06F 9/30134* (2013.01); *G06F 9/4436* (2013.01); *G06F 2217/68* (2013.01); *G06F 9/30* (2013.01); *G06F 17/5036* (2013.01); *G06F 9/3877* (2013.01)
USPC .......................................................... 703/21

(58) Field of Classification Search
None
See application file for complete search history.

(56) References Cited

U.S. PATENT DOCUMENTS

| | | | |
|---|---|---|---|
| 6,212,489 B1 | 4/2001 | Klein et al. | |
| 6,530,054 B2* | 3/2003 | Hollander | 714/739 |
| 7,328,195 B2* | 2/2008 | Willis | 706/14 |
| 8,494,831 B2 | 7/2013 | Chiou | |
| 2002/0107678 A1 | 8/2002 | Wu et al. | |
| 2002/0138244 A1 | 9/2002 | Meyer | |
| 2003/0154061 A1* | 8/2003 | Willis | 703/4 |
| 2003/0191615 A1 | 10/2003 | Bailey et al. | |
| 2004/0111708 A1 | 6/2004 | Calder et al. | |
| 2006/0031791 A1* | 2/2006 | Moona et al. | 716/3 |
| 2006/0173559 A1* | 8/2006 | Kirshenbaum et al. | 700/31 |

OTHER PUBLICATIONS

Schnarr, E., et al., "Fast Out-of-Order Processor Simulation Using Memoization," ASPLOS-VIII, pp. 1-12, (Oct. 1998).
Binkert, N.L., et al., "Network-Oriented Full-System Simulation Using M5," CAECW, pp. 1-8, (Feb. 2003).
Austin, T., et al., "SimpleScalar: An Infrastructure for Computer System Modeling," IEEE, pp. 59-67, (Feb. 2002).
Emer, J., et al., "Asim: A Performance Model Framework," IEEE, pp. 68-76, (2002).

(Continued)

Primary Examiner — Omar Fernandez Rivas
Assistant Examiner — Cuong Luu
(74) Attorney, Agent, or Firm — Hamilton, Brook, Smith & Reynolds, P.C.

(57) ABSTRACT

A simulator is partitioned into a functional component and a behavior prediction component and the components are executed in parallel. The execution path of the functional component is used to drive the behavior prediction component and the behavior prediction component changes the execution path of the functional component.

21 Claims, 4 Drawing Sheets

(56) References Cited

OTHER PUBLICATIONS

Moudgill, M., et al., "Environment for PowerPC Microarchitecture Exploration," IEEE, pp. 15-25, (May-Jun. 1999).

Mauer, C.J., et al., "Full-System Timing-First Simulation," ACM Sigmetrics Conference on Measurement and Modeling of Computer Systems, pp. 1-9, (Jun. 2002).

Jefferson, et al., "Distributed Simulation and the Time Warp Operating System," *Proceedings of the 11th, ACM*, pp. 77-93 (1987).

Jefferson, et al., "Virtual Time," *ACM Transactions on Programming Language and Systems*, vol. 7, No. 3, pp. 404-425 (Jul. 1985).

Larsen, E., et al., "MASE: A Novel Infrastructure for Detailed Microarchitectural Modeling," *ISPASS*, pp. 1-9 (Issued 2001; current version Aug. 7, 2002).

Wang, H., et al., Inferno: A Functional Simulation Infrastructure for Modeling Microarchitechtural Data Speculations, *IEEE International Symposium On*, pp. 11-21 (2003).

\* cited by examiner

METHOD TO SIMULATE A DIGITAL SYSTEM

RELATED APPLICATIONS

This application is a continuation of U.S. application Ser. No. 12/950,471, filed Nov. 19, 2010, which is a continuation of U.S. application Ser. No. 11/633,657, filed Dec. 4, 2006, now U.S. Pat. No. 7,840,397, which claims the benefit of U.S. Provisional Application No. 60/741,587, filed on Dec. 2, 2005.

The entire teachings of the above applications are incorporated herein by reference.

BACKGROUND OF THE INVENTION

Simulation is one method to predict the behavior of a target system (we use the term "target" to mean the system that is being simulated). A simulator mimics some or all of the behavior of the target. Simulation is often used when measuring the target system itself is undesirable for a variety of reasons including target unavailability, target cost, or the inability to appropriately measure the target.

Simulators are used in almost all fields and are implemented using a variety of technologies. Two examples of other simulators include wind tunnels used to measure the coefficient of drag on miniature models of automobiles and war games using live participants to test the capabilities of soldiers, commanders and military machinery. There is even a class of simulator games such as Simcity that simulates the growth and health of a city under the guidance of a player who acts as the city planner.

Though simulators can be implemented in a variety of ways, many current simulator hosts are computers (we use the term "host" to mean the system that runs the simulator.) A computer simulation is reproducible, duplicate-able so that many copies can be run, does not require physical objects and are generally easy to observe.

In addition to commonly serving as simulation hosts, computers are also simulation targets. Computers have long been sufficiently complex to require simulation to model behavior with any precision. Predicting the behavior of a computer system is useful for a variety of purposes including but not limited to (i) evaluating architectural alternatives, (ii) verifying a design, and (iii) development, debugging and tuning of compilers, operating systems and applications. A variety of behaviors ranging from performance to power to reliability is all useful to predict.

Virtually all computer simulators (we use the term "computer simulators" to mean "simulators of computer systems") run on computer hosts. One significant issue facing computer simulators is simulation speed, an important concern for all simulators. For example, a weather simulator that runs slower than real time has limited efficacy. One may argue, however, that as successive generations of computers get faster over time, the simulators that run on those computers will also get faster. In fact, simulators of the physical world do run faster as the host computer increases in speed because the physical world does not increase in complexity over time.

Simulators of computers, however, do not. The problem is rooted in the fact that the more complex the simulated target becomes, the more activity it engages in per unit simulated time. This results in an increase in the computation per simulated unit time that must be performed by the host. The greater the computation per simulated unit time, the slower the simulator. Unlike the physical world, computer targets grow in complexity as fast as or faster than the computer hosts improve in performance. Thus, the increased speed of the host is consumed by the increased complexity of the target, resulting in computer simulation speeds remaining roughly constant over time.

Computers are complex systems consisting of one or more components that run concurrently and interact with each other. These components include processors, memory, disk, video, network interfaces, and so on. Each component itself is a complex system, making it very difficult to predict almost all aspects of their behavior including performance, power consumption and even functional correctness. Thus, in order to accurately simulate their behavior, we need to faithfully model the interactions between each component and the components it interacts with. On such component in a computer system is a processor which are essentially special-purpose hardware designed to execute programs expressed in a specific instruction set architecture (ISA). An ISA is a specification that includes a set of instructions, such as ADD, BRANCH and LOAD/STORE, as well as some model of the storage of the processor such as a register specification and a memory specification. All processors implement some ISA allowing programs that assume that ISA is to be executed by that processor.

Different processor families have different ISAs. For example, one of the most common ISAs is the Intel IA-32, which is often called x86. Processors made by companies such as Intel, AMD, Centaur/VIA, and Transmeta implement the IA-32 instruction set. Different ISAs are not only possible but, at one time, they proliferated. The Sun Sparc ISA, Motorola/IBM PowerPC ISA, the DEC/Compaq/HP Alpha ISA, the IBM 360 ISA and the MIPS ISA are all ISAs that were supported by real processors.

ISAs tend to evolve over time. The original x86 instruction set, for example, did not include floating point instructions. As the need for floating point became clear and reasonable to implement, however, floating point instructions were added. Many other instructions were added to the x86 instruction set, including MMX and SISD instructions.

Though all processors implement an ISA, different processors implementing the same ISA may have very different organizations. The underlying organization of a processor is called that processor's micro-architecture. The micro-architecture consists of hardware and potentially software components that implement the ISA including instructions and memory. The micro-architecture can be logically broken up into components such as an instruction decode unit, registers, execution units, caches, branch prediction units, reorder buffers, and so on. Some components, such as the instruction decode unit and registers, are essential to the correct operation of the processor while other units, such as caches, while not essential to correctness, are important to optimize some behavior such as performance. Each component can often be implemented in many different ways that result in different behavioral characteristics and resources.

To understand how a micro-architectural component can change the performance behavior of a processor, consider an instruction cache. A cache automatically stores data recently accessed from memory and routinely services future requests for that data as long as it is in the cache. Accessing the cache is faster than accessing the memory. Since the cache is smaller than memory, it relies on a replacement policy that decides what instructions to keep in the cache and what instructions to replace with newly accessed instructions. The first time some code is executed, that code is not in the instruction cache and must be obtained from memory. The second time the code is executed, there is a chance that it is in the cache in which case the access is faster. Since the cache is limited in size, it may be that the particular code in question may have been replaced before it is used again. Cache behavior is heavily dependent on the dynamic usage of that cache. Thus, without running the program and somehow modeling the instruction cache, it is very difficult to determine whether or not the code is in the cache.

There are many more components and features within a processor contributing to behavioral variance such as superscalar and out-of-order execution, branch prediction, parallel execution, and virtual memory. In addition to the processor, there are many more components within a computer system that also contribute to behavioral variance. Added together, there can be a significant amount of behavioral variation that are dependent on a large number of variables including the programs being currently run, the programs that ran in the past, and external events such as the arrival of a network packet or a keyboard stroke.

The most accurate model of a computer is the computer itself. It is often the case, however, that it is impractical and/or impossible to use the computer itself to predict its own behavior. For example, the computer is not available to be measured before it is manufactured. Running applications on an existing system and using its behavior to directly predict the behavior of a next generation system is generally inaccurate since the new system will be different than the old one.

Due to the complexity of computer systems, their behavior is generally predicted using simulators. Most simulators are written entirely in software and executed on regular computers. Simulators can model computer system behavior at a variety of levels. For example, some simulators only model the ISA and peripherals at a "functional" level, that is, at a detail level sufficient to implement functionality but not to predict timing. Such simulators are often able to boot operating systems and run unmodified applications and can be useful to provide visibility when debugging operating systems and software.

Other simulators model computer systems at a detail level sufficient to accurately predict the behavior of the computer system at a cycle-by-cycle level. Such simulators must accurately model all components that could potentially affect timing. They are often written by architects during the design of a computer system to help evaluate architectural mechanisms and determine their effect on overall performance. Most processors today are implemented in hardware description languages (HDL) that enable the specification of the processor in Register Transfer Logic (RTL). Such specifications can also be simulated very accurately.

There are, however, issues with cycle-accurate simulators. For the most part, they are extremely slow. Most truly cycle-accurate simulators run at approximately 10K cycles per second or slower. RTL cycle-accurate simulations run at a few cycles per second at best. Though computers have been getting faster, the complexity of the machines that they were simulating has also gone up, keeping simulation speed fairly constant over time. With the proliferation of chip multiprocessors (CMPs), however, it is likely that simulation performance will drop rapidly unless simulators can be efficiently parallelized. Simulating multiple processors obviously takes longer than simulating a single processor on the same host hardware resources.

Current simulator speeds are far too slow to run full operating systems and applications. For example, a simulator running at 10K cycles per second takes 402 days to simulate a two-minute OS boot. Such times are far too long, forcing users to extract kernels that are intended to accurately model longer runs. Such kernels, however, are difficult to chose and often do not exercise all of the behavioral complexity. It would be far easier if accurate simulators were fast enough to run full, unmodified operating systems and applications.

Thus, computer system simulation is a difficult problem with no satisfactory full solutions.

SUMMARY OF THE INVENTION

Simulation performance is improved using parallelism. A simulator is parallelized by partitioning it into a functional component and a behavior prediction component such as a timing component. The functional component simulates the simulated system at a functional level and passes execution path information to the behavior prediction component. The behavior prediction component can change the functional component execution path as is necessary to accurately model the behavior. Changing the functional component execution path may require asking the functional component to do so. Either component can be implemented in software or hardware. The two components execute in parallel on some parallel platform that contains processors, hardware or some combination of the two. The hardware used could be one or more FPGAs. This scheme can be used to simulate computer systems.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of example embodiments of the invention follows.

Simulation is a commonly used method to predict the behavior of a target system when measuring the target system itself is undesirable for a variety of reasons including target unavailability, target cost, or the inability to measure the target appropriately. Simulation is used in virtually all engineering and scientific fields and has enabled significant advances in almost all of the fields that use it. Many simulators are computer programs running on standard computers.

Simulation performance is very important. For many applications, a minimum simulation performance is required to make the simulator useful. Faster simulation enables longer simulated times and more experiments to be run in the same amount of time and consequently, lends more confidence to the simulation results.

Disclosed is a method to significantly improve simulation performance by appropriately parallelizing the simulator in a very scalable fashion, causing it to run quickly and efficiently on a parallel host.

One way to implement a simulator is to partition it into two models: a functional model and a behavior prediction model. The functional model implements the functionality of the target but does not predict behavior beyond the target's functionality. The behavior prediction model predicts the target's behavior or behaviors of interest but does not implement any functionality.

To illustrate how this partitioning works, we describe a simulator partitioned in this fashion where the target is a conventional sequential computer executing a standard instruction set architecture that assumes that an instruction is completely executed before the next instruction starts executing. The target's computational performance is data independent, meaning that the number of cycles through an ALU is constant given a certain operation. Assume also that the desired behavior to predict is the target performance for a certain application. Because we are predicting performance, we use the term "timing model" in place of behavior prediction model. We also assume a conventional in-order issue but either in-order or out-of-order execution mico-architecture, as the target processor's micro-architecture.

Given these assumptions, the simulator is partitioned into a functional model that simulates the ISA of the processor and the functionality of the memory system and all of the peripherals of the target. It executes programs that would execute on the target. A complete functional model executes unmodified programs and unmodified operating systems compiled for the target. It appears to be, in virtually all aspects other than performance, the target computer.

The timing model only models structures required to predict the performance of the target machine, such as delay elements and arbiters. For example, the timing model the timing of the memory hierarchy including caches, memory and disk, branch predictors, instruction schedulers and the number of ALUs in the Execute stage. It does not, however, implement any of the functionality of the target machine. Thus, it is incapable of executing the ADD ALU function in the Execute stage.

There are many advantages to such a partitioning. Because the timing model does not implement any functionality and the functional model does not implement any timing prediction, the combination which creates the complete simulator is far simpler than the real target. For example, for targets whose performance is not data-dependent, the timing model does not need to store cache data since the data values do not affect performance. In fact, data often does not need to pass through the timing model at all because the timing model does not need the data values to predict performance. Likewise, for a target that presents a flat memory model to software, the functional model does not need any model of the cache. Thus, for such target systems the cache data is completely eliminated from the simulator, saving simulation resources and reducing simulation implementation effort.

Another advantage of such a partitioning is reusability of the models. A functional model can be reused for any target whose functionality is the same as the functional model. For example, an x86 functional model could be used to for virtually any computer that supports the same variation of the x86 instruction set. Likewise, a timing model can be reused for a target with the same micro-architecture.

Yet another advantage of such a partitioning is the ease by which the models can be created and modified. In this example, a timing model consists of simple components such as FIFOs, CAMs, registers, memories and arbiters. Assuming data independent performance, no data computation is required, eliminating full ALUs and FPUs implementations and enabling them to be modeled by delay elements such as pipeline registers.

Since the model components are often quite simple, making changes is also often quite simple. It is often the case that changes in timing are introduced during implementation. For example, it may be discovered during implementation that an ALU takes four cycles instead of three cycles. Making such a change within a timing model is trivial; one simply adds a pipeline stage to the ALU. Functionality does not need to be repartitioned across four stages from three stages since the functionality is implemented elsewhere.

Likewise, the functional model can also be easily changed. Since the functional model is not concerned with modeling timing, adding a new instruction or modifying an old instruction is generally far simpler than if the model combined functionality and timing.

A functional model that runs at maximally high performance is an aggressive computer system itself, making its implementation as difficult as any target. Thus, maximum performance is often impractical. It is often the case, however, that making reasonable compromises in performance can result in substantial implementation savings. For example, a functional model could be implemented as a software-based full-system functional simulator or a simple microcoded processor. Selecting a pre-existing functional model can also dramatically reduce the overall implementation effort.

Somehow, the functional model and timing model must interact to simulate functionality and accurately predict timing. A baseline method is to have the functional model generate an instruction trace that is passed to the timing model that uses that instruction trace to predict performance. We call the path of instructions naturally produced by the functional model the "functional path" and the instruction fetch path of the target processor the "target path". For now, we assume that the functional model generates an in-order instruction trace where every instruction is executed to completion before the next instruction starts executing and thus branches are perfectly resolved.

Figure 1:
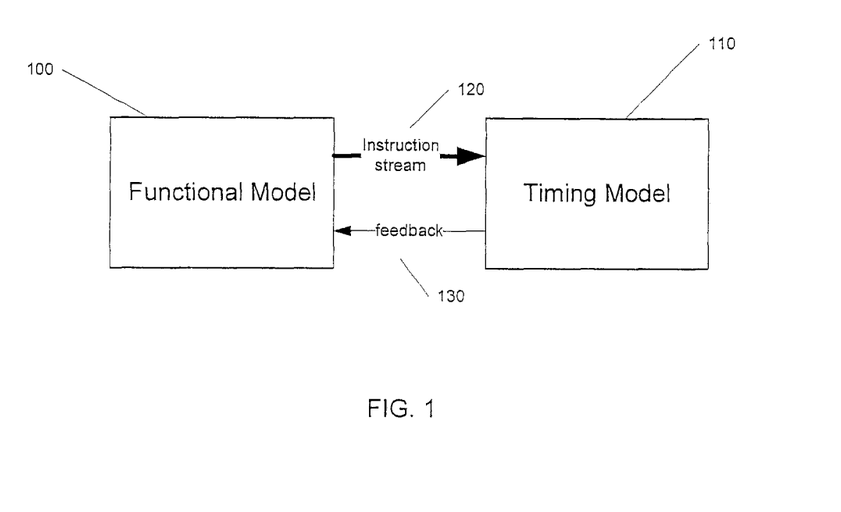
FIG. 1 shows a high level view of a partitioned simulator.

FIG. 1 is a high-level diagram of an embodiment of this invention. The functional model 100 generates an instruction stream 120 that is sent to the timing model 110. The timing model has a feedback path 130 back to the functional model for a variety of purposes that will be discussed later in the disclosure.

Figure 2:
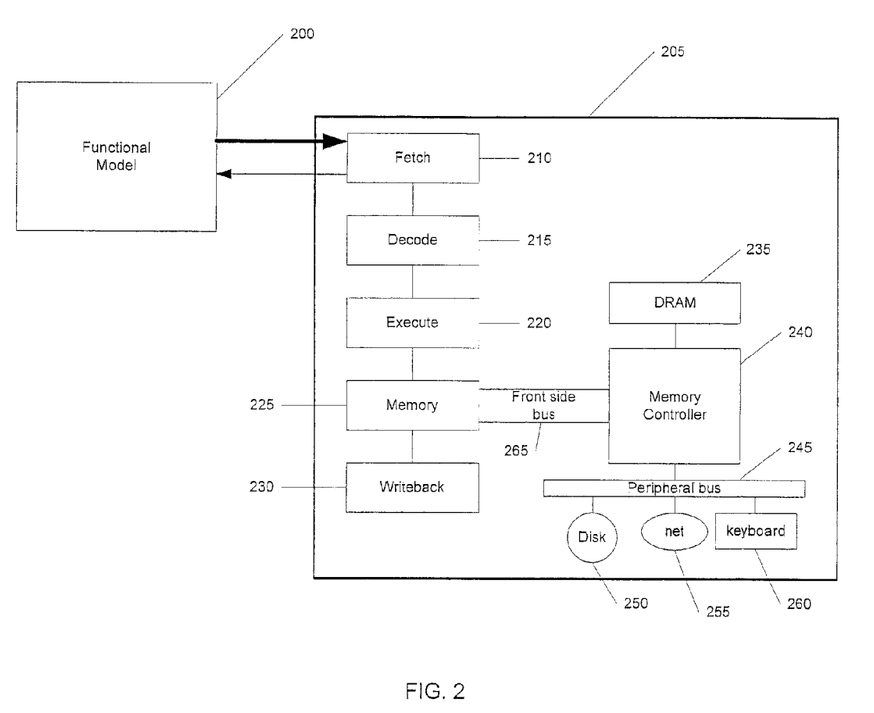
FIG. 2 shows a more detailed view of the timing model including a five stage pipelined processor, a memory controller, DRAM and a peripheral bus to which are attached a disk, a network interface, and a keyboard.

FIG. 2 shows a more detailed timing model 205 of one embodiment of the invention. The functional model 200 of this embodiment is shown for reference. This particular timing model models a five stage pipeline including Fetch 210, Decode 215, Execute 220, Memory 225 and Writeback 230 stages. A front side bus model 265 is connects the Memory stage model and the Memory Controller 240 model. The memory controller model 240 is attached to a DRAM model 235 and a peripheral bus model 245. The peripheral bus model is attached to a disk model 250, a network interface model 255 and a keyboard model 260. Note that there are more components modeled than just the processor itself to accurately predict the performance of the entire computer system, not just the processor. The functional model must also model the other components as well.

For a simple microcoded target processor that executes each instruction to completion before starting the next instruction, the functional path is equivalent to the target path. One possible implementation of the corresponding timing model reads each instruction from the functional model instruction trace and computes how much time each instruction would take. Thus, the timing model could be simply a lookup table that mapped each instruction to the number of cycles it takes to fully execute. If the target contains a single data cache, every memory operation would check to see if it hit in the cache and use that information to determine the amount of time the memory access took. Of course, cache replacement would have to be accurately modeled to determine whether an access hit or missed. The timing overhead to perform replacement would also need to be modeled.

For such a target, having the functional model pass an instruction trace to the timing model is sufficient for the timing model to accurately model performance. The timing model may pass aggregate data back to the functional model indicating that instructions have been retired for resource management and back-pressure purposes to ensure that the functional model does not overrun buffers.

A more aggressive target could complicate the interface between the functional and the timing model. Consider the classic five stage pipeline with Fetch, Decode, Execute, Memory and Writeback stages with a single cycle memory latency and no bypassing. For now assume a program with no branches. One possible timing model implementation would take instructions from the instruction trace into the Fetch stage. On each successive simulated cycle, that instruction would move through each of the stages if it was not stalled. The timing model must model stalls which, for this simple target, will occur only if there is a dependency on data that has not yet been written back to the register file.

Adding a blocking instruction and data cache is also straightforward. As each instruction passes through the Fetch stage and the Memory stage, a cache model is checked for a hit and either the instruction is stalled for the appropriate amount of time for the data to be fetched from memory and the cache to be updated, or the instruction passes to the next stage and the replacement bits within the cache model are updated. Non-blocking caches simply need to allow instructions that are not dependent on a pending miss to proceed. The timing model simply needs to add support for the appropriate cache models and permit those cache models to stall the pipeline.

If there are branches within the instruction stream, however, a potential problem could occur. In order to keep the pipeline full, branches must be predicted because the direction that the branch takes cannot be known until the appropriate condition code is generated which could occur in the Execute or Memory stage (we assume that condition code updates are aggressively bypassed) meaning that the branch could be resolved in the Decode or Execute stages. Assume that branches are always resolved in the Execute stage. Assume also that branches are always predicted not-taken. In that case, the functional path could sometimes be different than the target path because the target path would partially process wrong path instructions between the branch being mis-predicted and the branch being resolved.

It is important for the timing model to be able to determine whether or not the functional path is identical to the target path. It can do that by modeling the program counter (PC) and comparing its expected PC with the instruction address passed for each instruction in the instruction trace. If branch prediction is used, the expected PC is updated according to the branch prediction algorithm. Since the expected PC is the PC that would be used by the target, the expected PC is used to address the instruction cache.

A branch is determined to be mispredicted by comparing the branch target address from the functional path instruction stream to the expected PC. When the branch misprediction is resolved, the timing model expected PC will be forced to the value of the right path PC (which is the same as the functional path PC) following the branch.

The functional model passes functional path instructions which, given our assumptions, is the in-order non-speculative path. The target, however, would execute a predicted-not-taken path that may cause different stalls due to the different dependencies than the functional path.

Figure 3:
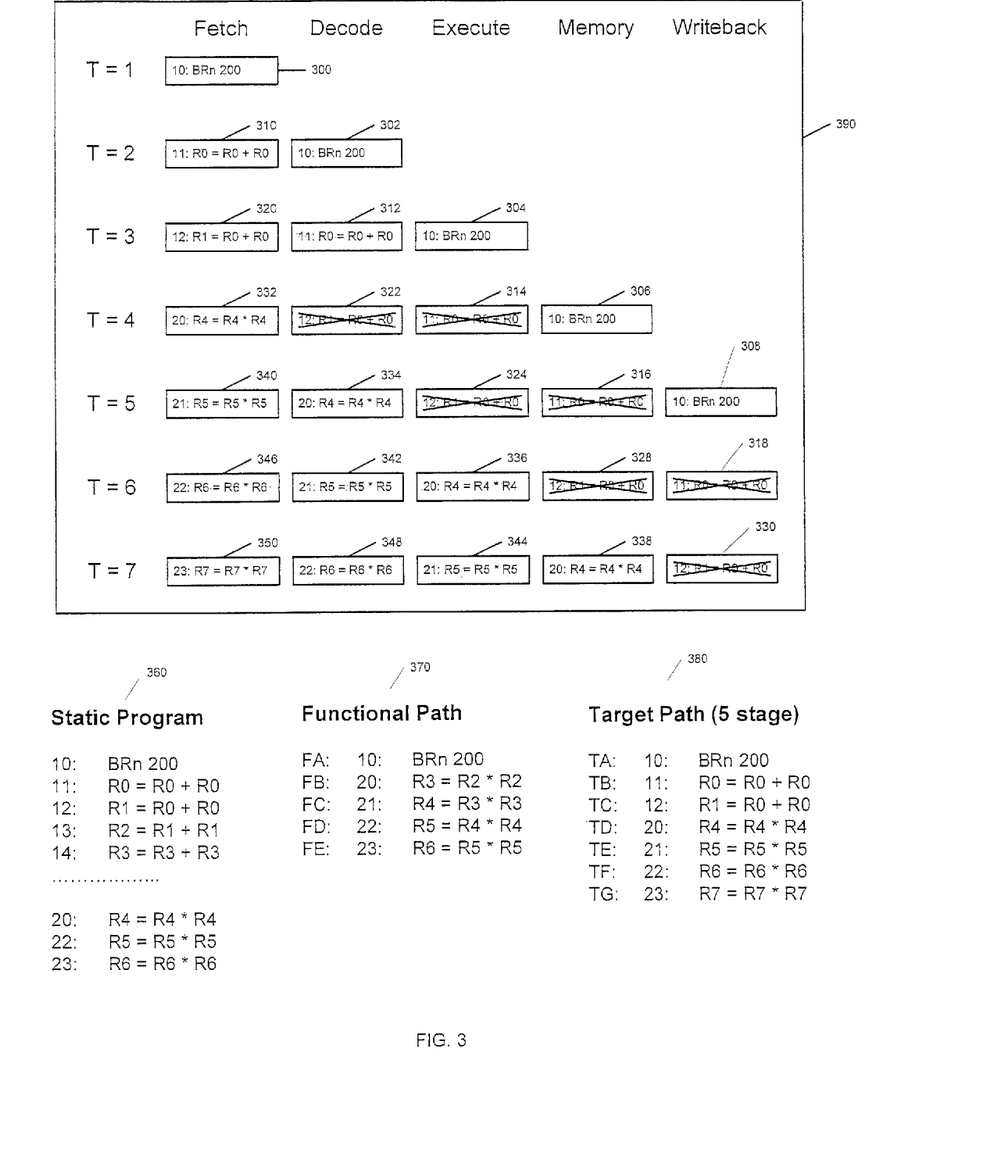
FIG. 3 provides the code that will be used in the examples shown in FIG. 3 and FIG. 4. It illustrates how instructions would move through a standard five stage pipeline in which branches are resolved in the Execute stage.

FIG. 3 illustrates how instructions would be processed by a five stage pipeline with predicted-not-taken branch prediction assuming that branches are resolved in the Execute stage. The static program 360 is given as a series of address/instruction pairs. The functional path 370 is given. The target path is given both in 380 and in time steps 390. Each of the five columns in 390 is one of the five stages of the pipeline. Each successive row represents a successive cycle. The branch-on-negative (BRn) instruction starts in the Fetch stage 300 when T=1, moves to the Decode stage 302 when T=2, to the Execute stage 304 when T=3, to the Memory stage 306 when T=4 and to the Writeback stage 308 when T=5. Instruction address 11 (310, 312, 314, 316, 318) and Instruction address 12 (320, 322, 324, 328, 330) are speculatively fetched and decoded using the predicted-not-taken prediction strategy. When the branch reaches the Execute stage, it is resolved and determines that the two following instructions are mispeculated and cancels them (314, 316, 318, 322, 324, 328 and 330). Instruction address 20 (332, 334, 336, 338), 21 (340, 342, 344), 22 (346, 348) and 23 (350) are processed by the pipeline. Thus, the target path is Instruction addresses 10, 11, 12, 20, 21, 22, 23.

The functional path, however, is 10, 20, 21, 22, 23. It does not contain Instruction address 11 and 12 because the branch is resolved by the functional model before the next instruction is generated. Thus, the functional path differs from the target path. This difference could introduce inaccuracies if the functional path is always used as is and cannot be modified.

In the five stage pipeline case where branches are resolved in the Execute stage, however, differences in pipeline stalls are impossible. The first time a stall could occur is in the instruction following the branch which is resolved by the Execute stage. Since misspeculation is detected in the Execute stage and the misspeculated instructions promptly killed, no misspeculated instructions will reach the Execute stage and thus the stalling characteristics will accurately model the target. We are assuming that no state is being modified in Decode and that Fetch only modifies the instruction cache to reflect the next instruction fetch. The Fetch stage has fetched from the expected PC and thus the modifications it has generated by accessing the instruction cache are correct.

Figure 4:
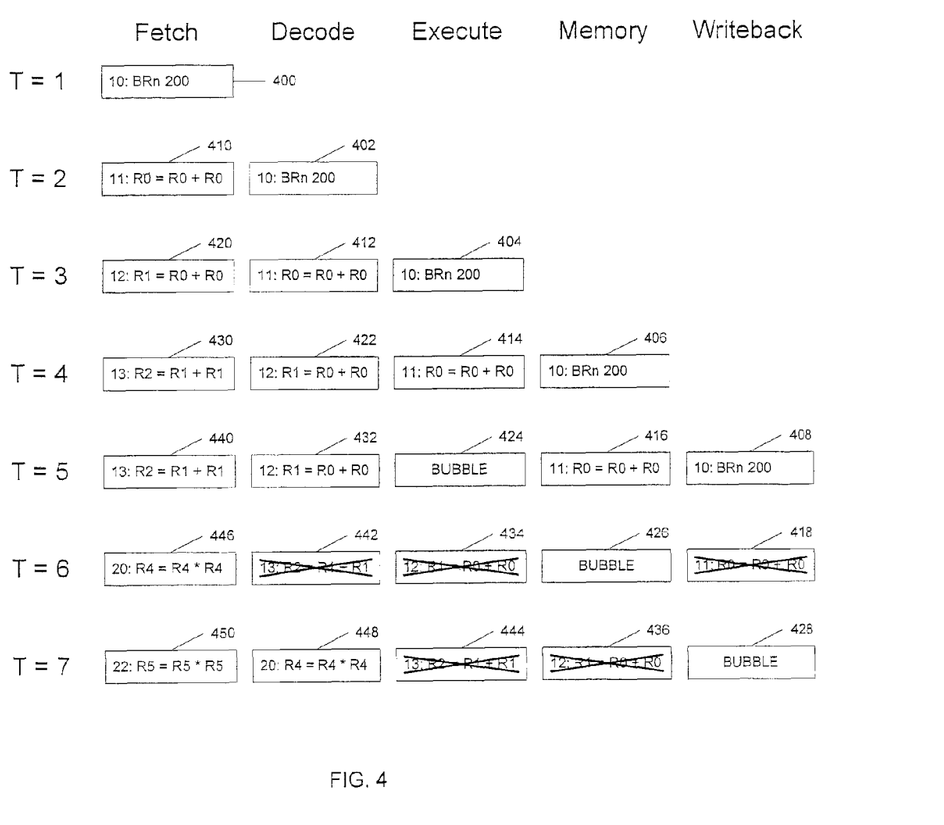
FIG. 4 illustrates how instructions would move through a standard five stage pipeline in which branches are resolved in the Writeback stage.

If, however, branches are resolved in the Writeback stage and there is no data bypassing, it is possible that the difference between the functional path and the target path could create an inaccuracy in the simulation. FIG. 4 shows an example of such a possibility. The code is the same as in FIG. 3. Because branches are not resolved until the Writeback stage, Instruction addresses 11 (410, 412, 414, 416, 418) 12 (420, 422, 424, 426, 428) and 13 (430, 432, 434, 436) are fetched and processed due to branch mis-prediction. In time T=4, a dependency is detected between Instruction address 11 and 12. Thus, a bubble (424, 426, 428) is introduced into the pipeline. If the functional path instructions were used, however, that bubble would have never been introduced because the functional path instructions do not have any data dependencies. Since, at this point, we only have in-order path instructions in the functional path instruction stream, we cannot correctly determine whether or not that stall should occur. Thus, we would need the target path instruction stream that would include wrong path instructions to accurately model performance.

The functional path, however, does not naturally contain the wrong path instructions. Also, the timing model does not, in general, have the capability to generate the wrong path instructions on its own. Thus, the functional model must somehow determine when to generate wrong path instructions, generate those wrong path instructions and return to the functional path once the timing model determines that the mis-speculated branch has been resolved.

Because different micro-architectures will misspeculate differently and resolve misspeculations differently, the functional model must get misspeculation information from the timing model since the functional model knows nothing about the target micro-architecture. Thus, the timing model informs the functional model when a misspeculation occurs and what the misspeculated branch target address is. It also informs the functional model when the misspeculated branch is resolved. The functional model must produce the correct wrong path instructions when notified of a misspeculation and then switch back once it is notified that the branch is resolved. Of course, multiple misspeculated branches implies that switching back after resolving a misspeculation could continue wrong path execution for an earlier branch.

One way for the functional model to generate wrong path instructions is for it to support the ability to "rollback" to a branch and then continue to the next instruction as instructed by the timing model. One implementation of such a rollback operation can be accessed using a set_pc command that takes two arguments, a dynamic instruction number and the instruction address to force that dynamic instruction to. Given such an interface, the timing model calls the functional model when necessary to indicate a misspeculated branch as well as the resolution of the branch.

To generalize, there is a potential issue if the instruction path naturally generated by the functional model (called the functional path) is different than the instruction path that would have been generated by the target (called the target path). As we saw in our five stage in-order pipeline where branches are resolved in the Execute stage, there are cases when such a difference does not matter. The five stage in-order pipeline where branches are resolved in the Writeback stage example, however, demonstrated why such divergences can matter. In general, modern branch-predicted, out-of-order microprocessor targets also have problems with functional/target divergence. Though most standard branch-predicted microprocessors retire instructions in program order, they generally implement branch prediction. Target path instructions are also needed in this case to predict performance.

Given an in-order functional model modeling a standard out-of-order target, the functional model will often not execute instructions in the same order as the target. Most target processors, however, issue instructions in order and only execute out of order. Thus, modulo branch misspeculation, an in-order path is the required target path. Forcing the functional model to execute out-of-order is generally unnecessary from a functional model correctness point of view (but would still be functionally correct since all the dependencies would be maintained) but would generate an incorrect instruction stream. In fact, without the in-order instruction stream, the timing model would not be able to reorder those instructions correctly. We revisit instruction reordering when discussing parallel targets.

If the ISA being modeled permits, it is possible for different functional models to generate different functional paths. For example, assume an ISA that permits flexibility in choosing which instruction out of a pool of instructions to execute next. For example, imagine a Very-Long-Instruction-Word (VLIW) instruction set that specifies three instructions per long instruction. A reasonable ISA specification may state that a correct execution order would allow those three instructions to be executed in any arbitrary order. One functional model may choose one order and another functional model may choose another. Even in such a case, such differences do not matter unless the functional correctness is broken or the timing model would require the instructions in a different order. A timing model could be written in such a way to handle such out-of-orderness in the functional stream.

A key insight is that branch prediction works because most branches are predicted correctly. Otherwise, the overhead of recovering from a misspeculated branch (throwing away the effects of the wrong path instructions and restarting from the misspeculated branch) could make branch prediction a performance loss.

To summarize up to this point, the disclosed method describes a simulator that generates a target path by starting with a functional path and then permitting the timing model to inform the functional model of differences between the two paths and how to make them consistent. Because the functional path is often the same as the target path, however, the timing model rarely changes the functional path.

A key insight of the disclosed method is the observation that since round trip communication between the functional model and timing model is minimized, such a functional/timing partitioned simulator is well suited to be run on a parallel host, where the functional model and the timing model run in parallel. The method takes advantage of the fact that the functional path is often identical to the target path. When the functional path is identical to the target path, the simulator is driven by the functional model with no feedback required from the timing model. Only when the functional path and the target path diverge does the timing model need to communicate with the functional model to steer the functional model down the target path and thus generate the correct instructions to accurately predict performance.

A simple parallelized host using this method could run the functional model in one processor and the timing model in another processor. For many targets and hosts, however, such an implementation is unlikely to result in better performance. The reason is that for many micro-architectures, the timing model consumes far more time than the functional model and thus splitting the two models only removes the performance burden of the functional model from the processor running the timing model while introducing communication costs.

The timing model itself could be parallelized and run on multiple host processors. Depending on the latency and bandwidth between the host processors, this technique could significantly improve performance. Most timing models, however, would require very frequent communication which could overload most current processors. As multiple cores on a single processor die become more prevalent, however, the communication may become tractable.

The timing model often models massively parallel hardware structures. High performance simulation of massively parallel structures almost demands a massively parallel host. A good massively parallel host is hardware.

The preferred embodiment further parallelizes the functional/timing partitioned simulator by implementing the timing model in hardware. Field programmable gate arrays (FPGAs) are an excellent hardware host since they are reprogrammable, fairly dense and fairly fast. Since many timing models do not need to model the data path, they generally consume very few hardware resources and thus can often fit into a single FPGA or a few FPGAs.

Hardware designed to implement a functional model is, by our definition, a computer system. The very best hardware architectures for executing instructions quickly are processors. Thus, the functional model will be hosted on one or more processors in a computer system. The host could either use a "hard" processor that is implemented directly in hardware, a "soft" processor that is implemented in an FPGA fabric or a software functional model simulator. Regardless of the underlying hardware, the functional model must be able to generate a trace for the timing model and must have support for the timing model to change the instruction execution path to generate the target path.

The preferred embodiment implements the functional model as a software simulator running either on a hard processor or a soft processor. Existing full system simulators that already run unmodified software and operating systems can be modified to produce an instruction trace and provide the timing model the ability to modify the instruction execution path. Though such modifications are non-trivial, the fact that such an approach leverages existing simulators with full system execution capabilities makes this approach very attractive.

A soft processor that directly executes the desired target system and provides tracing and the ability to modify instruction execution is another possible functional model that will likely run quickly and could be available in the near future. Implementing such a soft processor, however, can be quite difficult when modeling complex ISAs such as Intel's x86 and complex systems. Thus, though such a soft processor may eventually be a better solution, the potentially tremendous effort of implementing the soft processor will likely delay the first implementations of such an approach.

It is interesting to note that if the simulator runs quickly, the functional path is frequently equivalent to the timing path. If they are generally equivalent, the functional model rarely needs feedback from the timing model and thus rarely encounters the functional path→mis-speculation→wrong path or wrong-path→resolution→functional path loop that has significant impact on performance.

A system partitioned in such a fashion is capable of running in excess of ten million instructions per second when the functional model runs on a standard off-the-shelf microprocessor and the timing model runs on an FPGA. Such a system can run at these speeds simulating a complex ISA like the Intel x86 ISA, boots unmodified operating systems and runs unmodified applications and can be fully cycle accurate. Truly cycle accurate pure-software simulators of similar complexity modeling the x86 ISA run about one thousand times slower or at about ten thousand cycles/instructions per second and do not generally boot operating systems.

In addition, because the timing model runs on an FPGA, statistics gathering can be done within the timing model using dedicated hardware. Thus, even extensive statistics gathering can be done with little to no impact to performance. Gathering statistics on a software simulator consumes host processor cycles and thus has a significant impact on simulation performance. The greater the number of statistics gathered, the slower the simulation.

For simplicity the above description is focused on a standard sequential microprocessor-based system. This method is equally applicable to parallel targets that contain multiple processors or processor cores. To illustrate, assume a two processor shared memory target system. Each processor must be functionally modeled by the functional model. The functional model could be implemented in a variety of ways including by two host processors or by a single multi-threaded host processor. In the former case, care must be taken to handle I/O operations to shared devices correctly which can be done by ensuring that shared I/O devices can be rolled back by the timing model. We assume an in-order functional model. They will each access a global shared memory which we assume for now is uncached by the host processor.

The timing model back-pressures each processor's functional model to ensure that it does not get too far ahead of the other processor. Thus, each functional model is executing instructions close in simulated time to when it would be executing those instructions on a real target.

Assuming that nothing in the system ever read/write the same memory location close enough in simulated time to make precise ordering important, the two processors can execute as if they were each a uniprocessor system. The only time there is a potential issue is if one device (a processor or another bus device) writes a location that another device is reading at approximately the same time and the functional model chooses the incorrect ordering for the given target.

The timing model can detect that the functional model incorrectly ordered memory operations using a variety of methods. One simple method is to include the read/written data in the instruction trace and compare the read value with the value it should have read given that a write to the same address has not yet retired. One simple implementation of such a method uses an associative structure to track the read/write reorderings. In addition, if there is a read/write mis-order, if the write wrote the same value that was originally in the read memory location, there is no error.

If an incorrect ordering is detected, rollback can be used to correct the problem. Once a problem is detected, the timing model immediately freezes since it is possible that the instruction sequence it has been operating with is incorrect since the reordering might actually result in a different value returned in response to a read that could then result in a different instruction sequence. However, since the target would not have read that value until that instruction was executed and because until that value was read we could not branch on the value and thus the branches depending on that value must have either been predicted or stalled, the timing model is not corrupted. By then having the functional model feed the corrected addresses to the timing model, the timing model can resume from where it was frozen.

The described parallel target simulator can model a target that implements sequential consistency. To model a target with certain weaker models would require the ability for the timing model to specify a non-program order of executing some instructions. The timing model can very easily track when instructions are actually executed and pass that information to the functional model in the cases where instructions actually need to be executed in that order in order to achieve functional correctness.

A very weak memory model, where reads and writes to the same location can get out of order, may require modeling caches that are not always coherent. There is no reason why cache data cannot be modeled in the timing model and thus such weak memory models can be simulated. One strategy is to model the data in DRAM local to the functional model and have the timing model maintain the cache coherency.

The described method does not address data speculation, where data values are predicted and the program runs assuming that data. Data speculation can also be handled by the described method, but the data speculation mechanism needs to be accurately modeled with data so that a mis-speculation can be detected and corrected using rollback.

Note that the functional model providing the initial path and the timing model modifying that path is very general and can handle virtually any sort of target path. Thus, though we described branch prediction, parallel targets and data speculation, the technique can be applied in many other areas.

The initial description assumed a very strict separation of the functional model and timing model. It may be advantageous to relax that separation. For example, implementing a branch predictor predictor in the functional model would allow the functional model to predict a misspeculation and act on that prediction, sending wrong path instructions before being asked for them. The functional model could also guess when the branch would be resolved. Only if the functional model mispredicted would a round-trip communication be in the critical path.

Another place where a relaxed separation could benefit is using the timing model to store state for the functional model. For example, the timing model could store state to assist in rollback. The functional model could pass the old value of registers and memory as they are being written. If the functional model needed to rollback, it could get the old state, nicely formatted and redundancy eliminated, from the timing model.

Though this disclosure has focused on performance as the desired behavior to predict, other behaviors such as dynamic power prediction can also be done using similar methodologies. Additional data might need to be passed through the behavior prediction model, but the same methodology of using a functional model to generate a functional path which can then be modified by the behavioral prediction model still applies.

Though this disclosure has focused on computer targets, almost any target that can be separated into a functional model and a behavioral model could be simulated in this fashion. Thus, many silicon chips could be simulated in this fashion. With the appropriate hooks in place, previous generations of a chip could serve as a functional model for a next generation design.

For example, let us examine an ingress traffic manager that is commonly found in networking gear. A traffic manager interfaces with a network processor that classifies the packet and determines the destination or destinations of that packet and a switch fabric that moves that packet to the appropriate output port or ports. The traffic manager simply accepts packets marked with their destinations and passes them through to the fabric. If the fabric can always accept all of the packets the traffic manager passes, the traffic manager is essentially a wire. If, however, the fabric cannot, either temporarily or persistently, accept packets, the traffic manager must decide which packets to submit to the fabric and which ones to hold back and, if necessary, drop.

Thus, an ingress traffic manager might do the following: receives packets, buffers them, determine which packets to send and determine which packets to drop. Functionally, the traffic manager could remain the same even though different implementations might have very different performance characteristics.

It is possible to partition a traffic manager simulator into a functional model and a timing model, where the functional model indicates what it does (corresponding to the instruction stream) to the timing model and the timing model predicting time.

The timing model may notice that the functional model does not have a particular piece of information (such as the fact that a packet is fully queued which may be a requirement before inserting that packet into the fabric) and thus force the functional model to rollback and re-execute with a corrected version of its information. Thus, the disclosed method can be used to simulate targets other than a computer system.

While this invention has been particularly shown and described with references to example embodiments thereof, it will be understood by those skilled in the art that various changes in form and details may be made therein without departing from the scope of the invention encompassed by the appended claims.

What is claimed is:

1. A host system apparatus for simulation configured to:
   execute a functional component and a behavior prediction component in a simulator partitioned into the functional component, which models a digital target system's functionality, and the behavior prediction component, which predicts behavior of the digital target system;
   pass an output of the functional component to the behavior prediction component that uses that output to predict behavior;
   compare information from the functional component output with behavior predicted by the behavior prediction component; and
   when the output of the functional component is inconsistent with the predicted behavior, provide information from the behavior prediction component to the functional component to correct the functional component output.

2. An apparatus as claimed in claim 1, wherein at least one component is implemented in hardware.

3. An apparatus as claimed in claim 2, wherein the hardware comprises a field programmable gate array (FPGA).

4. An apparatus as claimed in claim 1, wherein the functional component is implemented in software.

5. An apparatus as claimed in claim 4, wherein the behavior prediction component is implemented in hardware.

6. An apparatus as claimed in claim 5, wherein the hardware comprises an FPGA.

7. An apparatus as claimed in claim 6, wherein the simulator simulates a computer system.

8. An apparatus as claimed in claim 1, wherein the behavior prediction component is a timing model that predicts performance.

9. An apparatus as claimed in claim 1, where the functional component and the behavior prediction component are executed in parallel.

10. An apparatus as claimed in claim 1, where the behavior prediction component detects incorrect functional memory operation ordering by comparing values read by the functional component with the target correct values that it should have read.

11. An apparatus as claimed in claim 10, where an associative structure is used to track read/write reorderings.

12. An apparatus as claimed in claim 1, where rollback of the functional component is used in correcting the functional component output.

13. An apparatus as claimed in claim 1, where an existing software simulator is modified into a functional component.

14. A host system apparatus for performing a simulation of a digital target system, the apparatus configured to:
   execute a functional component and a behavior prediction component in a simulator partitioned into the functional component, which models the digital target system's functionality, and a behavior prediction component, which predicts behavior of the digital target system;
   pass an instruction trace of the functional component to the behavior prediction component that uses that instruction trace to predict behavior;

compare information from the functional component instruction trace with behavior predicted by the behavior prediction component; and when the instruction trace of the functional component is inconsistent with the predicted behavior, provide information from the behavior prediction component to the functional component to correct the functional component instruction trace.

15. An apparatus as claimed in claim 14, wherein the functional component is implemented in software.

16. An apparatus as claimed in claim 15, wherein the behavior prediction component is implemented in hardware.

17. An apparatus as claimed in claim 16, wherein the hardware comprises an FPGA.

18. An apparatus as claimed in claim 17, wherein the simulator simulates a computer system.

19. An apparatus as claimed in claim 14, wherein at least one component is implemented in hardware.

20. An apparatus as claimed in claim 19, wherein the hardware comprises a field programmable gate array (FPGA).

21. An apparatus as claimed in claim 14, where the functional component and the behavior prediction component are executed in parallel.

* * * * *